United States Patent [19]
Hess et al.

[11] 3,709,133
[45] Jan. 9, 1973

[54] ADAPTER FOR TELEVISION CAMERA

[75] Inventors: Karl Gunter Hess, Waldlaubersheim; Kurt Werner, Munster-Sarmsheim, both of Germany

[73] Assignee: Jos. Schneider & Co., Bad/Kreuznach/Rhineland, Germany

[22] Filed: May 25, 1971

[21] Appl. No.: 146,660

[30] Foreign Application Priority Data

April 21, 1971 Germany..................P 20 25 960.3

[52] U.S. Cl..................................95/45, 95/44 R
[51] Int. Cl..........................................G03b 3/10
[58] Field of Search..........................95/44 R, 45

[56] References Cited

UNITED STATES PATENTS

| | | |
|---|---|---|
| 2,862,430 | 12/1958 | Clift et al..................................95/45 |
| 2,918,842 | 12/1959 | Smith...................................95/45 X |
| 2,925,765 | 2/1960 | Gebele..................................95/45 X |
| 3,465,661 | 9/1969 | Hahn et al............................95/44 R |
| 3,541,941 | 11/1970 | Barr.........................................95/45 |

Primary Examiner—Samuel S. Matthews
Assistant Examiner—E. M. Bero
Attorney—Karl F. Ross

[57] ABSTRACT

An objective housing, containing zooming mechanism including a motor for adjusting its varifocal lens assembly, has its rear wall fitted with a socket for engagement by an electrical connector or an adapter plate which is similarly connectable to an electric outlet for a TV camera to be coupled with the objective by means of this plate. A central aperture in the adapter plate for gives passage to light rays entering the camera through the lens assembly.

3 Claims, 1 Drawing Figure

PATENTED JAN 9 1973 3,709,133
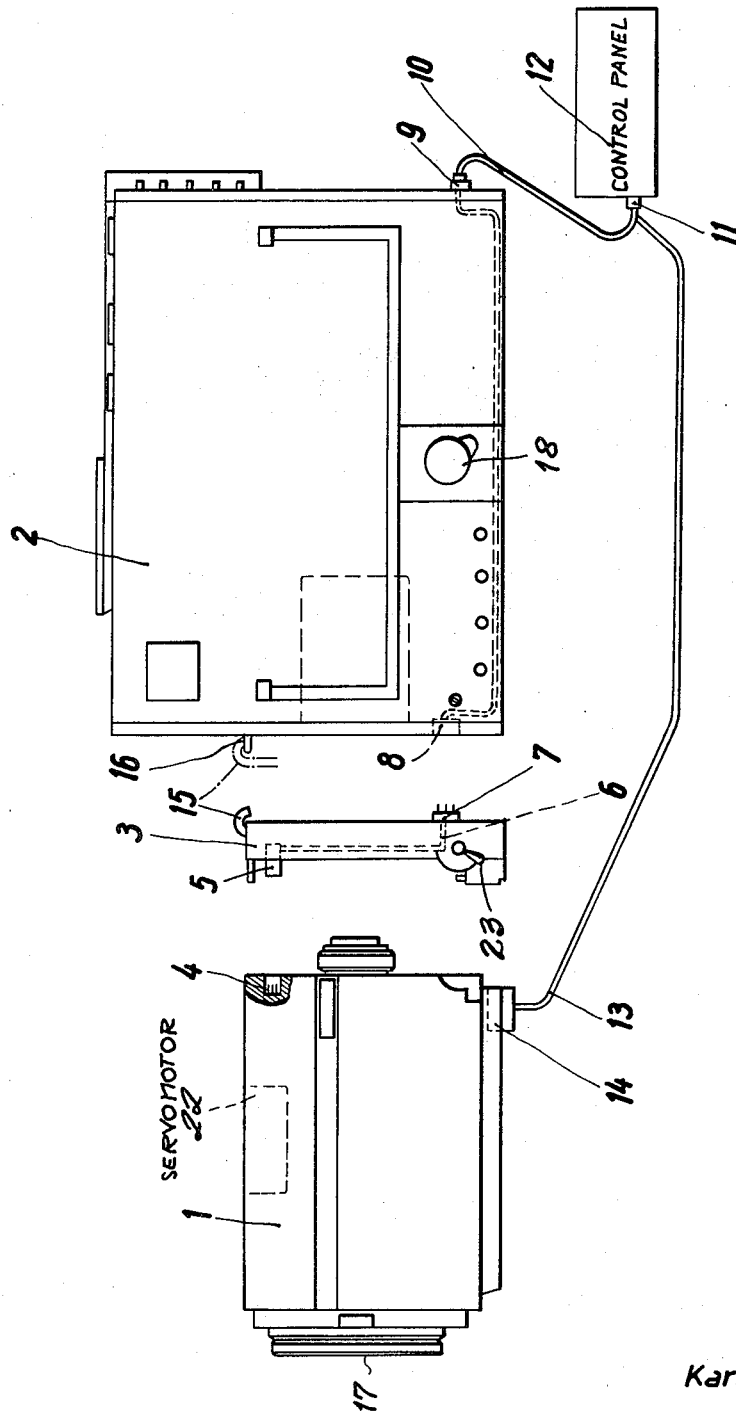
Karl-Günter Hess
Kurt Werner
Inventors.
By Karl F. Ross
Attorney

ADAPTER FOR TELEVISION CAMERA

Our present invention relates to a camera, e.g. for television purposes, whose objective housing includes mechanism for the displacement of part of its lens assembly to focus it and/or to change its focal length (zoom effect).

In commonly owned applications Ser. Nos. 602 (now U.S. Pat. No. 3,656,422) and 70,124, filed Jan. 5 and Sept. 8, 1970 by Karl-Gunter Hess, Paul Himmelsbach and Otto Thomas, there has been disclosed an objective housing to which a pair of identical driving units are removably attached, each unit including an electric motor in a prismatic casing with a motor shaft and an electric connector projecting from one end of the casing. Upon emplacement of the casing in the larger housing, the motor shaft engages a transmission shaft leading through a slipping clutch to a respective cylinder; at the same time an electric connection is established from the motor to zooming and focusing controls which may be located outside the housing.

The object of our present invention is to provide simple means for establishing the necessary mechanical and electrical connections between a camera and an objective housing so equipped.

This object is realized, pursuant to the present invention, by the provision of an adapter plate removably attached to confronting sides of the objective housing and the camera, opposite sides of this plate being provided with electrical connectors such as plugs or sockets mating with complementary connectors on the objective and the camera, respectively, to complete an electric control circuit while the objective is physically attached to the camera.

The adapter plate may be provided with a hand lever or the like for releasably coupling it to the camera.

These and other features of our invention will be described in detail hereinafter with reference to the accompanying drawing the sole FIGURE of which diagrammatically shows, in side elevation, a television camera with detachable objective according to a representative embodiment.

As shown in the drawing, an objective housing 1 with lens assembly 17 (partly visible at its front and back) is removably connectable to a television camera 2 including a stepdown transformer (not shown) energized from without via a supply terminal 18. For the selective adjustment of the focal length of the variofocal objective, for focusing, and for diaphragm control, housing 1 contains several servomotors 22.

In accordance with this invention, an adapter plate 3 is interposed between the objective and the camera, this plate having a central aperture (not shown) for traversal by the light rays passing through the lens assembly 17. Current may be supplied to the several servomotors in housing 1 via multiple male connectors 5, 7 on plate 3 adapted to engage mating female connectors 4, 8 in the rear face of housing 1 and the front face of camera 2, respectively. Connectors 5, 7 are linked within plate 3 by a cable 6 whereas connector 8 leads partly to a supply transformer and partly to a cable 10 terminating at a control panel 12. In some instances, in which the external power supply is directly connected to the objective housing, a cable 13 may directly connect the control panel 12 with that housing via a plug 14.

A pair of hooks 15 (only one shown) on plate 3 are engageable with eyes 16 on camera 2 whereupon the plate may be fully secured, together with the objective housing 1 detachably bolted thereto, to the camera with the aid of a latch (not shown) controlled by a lever 23. If the objective is to be fitted to a different camera, adapter plate 3 can be replaced by another such plate.

We claim:

1. In combination, an objective comprising a housing with a rear face; a lens assembly in said housing projecting from said rear face; electric control means for said lens assembly in said housing; an adapter plate removably attached to said rear face and provided with a central aperture in line with said lens assembly; a camera with a front face separated from the rear face of said housing by said adapter plate; a first pair of mating electrical connectors on said rear face and an adjoining front surface of said adapter plate; a second pair of mating electrical connectors on said front face and an adjoining rear surface of said adapter plate; circuit means including said pairs of connectors for supplying electric energy to said control means; and releasable coupling means on said adapter plate for substantially joining same together with said housing to said camera.

2. The combination defined in claim 1 wherein said circuit includes a cable within said adapter plate linking the connectors on said front and rear surfaces thereof.

3. The combination defined in claim 1 wherein said camera is a television camera.

* * * * *